United States Patent [19]

Small

[11] Patent Number: 5,799,760
[45] Date of Patent: Sep. 1, 1998

[54] ENERGY ABSORBING DEVICE

[76] Inventor: Gregory E. Small, 164 Farmingdale Blvd., Winnipeg, Manitoba, Canada, R3P 2G5

[21] Appl. No.: 727,392

[22] PCT Filed: Apr. 27, 1995

[86] PCT No.: PCT/CA95/00251

§ 371 Date: Oct. 10, 1996

§ 102(e) Date: Oct. 10, 1996

[87] PCT Pub. No.: WO95/29738

PCT Pub. Date: Nov. 9, 1995

[30] Foreign Application Priority Data

Apr. 28, 1994 [CA] Canada ................... 2122437

[51] Int. Cl.⁶ ................. A62B 35/04; F16F 7/12
[52] U.S. Cl. ................. 188/371; 267/155; 182/3
[58] Field of Search ................. 188/371–377, 188/381, 65.1–65.5; 244/110 C, 151 R; 297/472, 471, 470, 480; 248/548; 182/3; 280/805, 806; 256/13.1; 404/10; 267/69–74, 155, 156; 242/379.1; 104/115

[56] References Cited

U.S. PATENT DOCUMENTS

| 3,337,004 | 8/1967 | Hoffman et al. ............... 188/1 |
| 3,444,962 | 5/1969 | Lech ............................... 188/371 |
| 3,482,872 | 12/1969 | Chamberlain ................ 297/386 |
| 3,486,791 | 12/1969 | Stoffel et al. ................. 188/371 |
| 3,561,690 | 2/1971 | Musket .......................... 188/373 |
| 3,599,757 | 8/1971 | Takamatsu et al. ........... 188/1 C |
| 3,804,396 | 4/1974 | Seybold ........................ 267/166 |
| 4,062,994 | 12/1977 | Millman et al. ............... 428/101 |
| 4,100,996 | 7/1978 | Sharp ............................ 182/3 |
| 4,358,136 | 11/1982 | Tsuge et al. ................... 280/806 |
| 4,446,944 | 5/1984 | Forrest .......................... 182/3 |
| 4,538,702 | 9/1985 | Wolner .......................... 182/3 |
| 5,174,410 | 12/1992 | Casebolt ........................ 182/3 |
| 5,224,427 | 7/1993 | Riches et al. .................. 104/115 |

FOREIGN PATENT DOCUMENTS

| 2063246 | 5/1990 | Canada . |
| 2085600 | 5/1992 | Canada . |
| 0252031 | 1/1987 | European Pat. Off. ...... F16F 7/12 |
| 1531512 | 7/1970 | Germany ..................... 297/471 |
| 2218910 | 10/1973 | Germany ..................... A62B 35/00 |
| 2249732 | 4/1974 | Germany ..................... 297/472 |
| 2084691 | 9/1980 | United Kingdom ......... F16F 7/12 |

*Primary Examiner*—Douglas C. Butler
*Attorney, Agent, or Firm*—Riches, McKenzie & Herbert

[57] ABSTRACT

An energy absorbing device for safely arresting moving bodies. Applications of the device include fall protection systems that protect workers on elevated structures from accidental falls. The energy absorbing device includes a coiled strip capable of dissipating energy when a tensile force applied across the device generates an internal bending strain that exceeds the elastic limit of the material. The tensile load developed on the safety track during an accidental fall unwinds the strip, thus progressively taking-up the kinetic energy of the moving body.

26 Claims, 11 Drawing Sheets

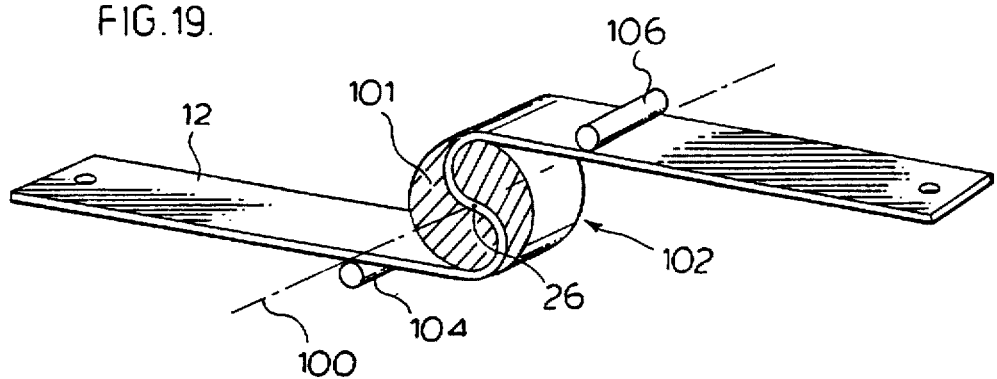
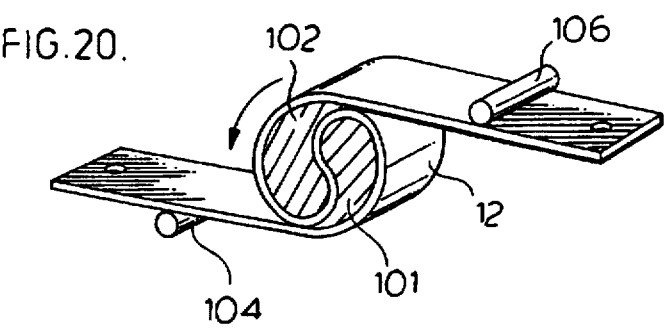
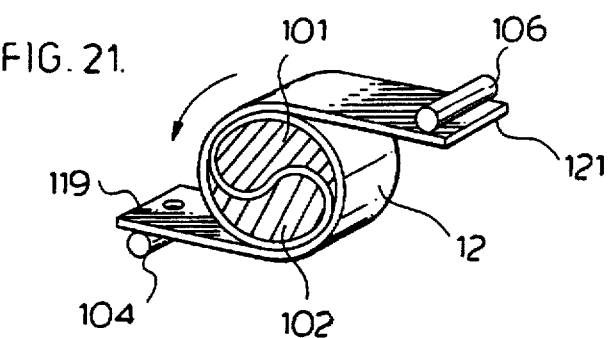

5,799,760

ENERGY ABSORBING DEVICE

FIELD OF THE INVENTION

The invention relates to the field of safety equipment, more particularly to a novel energy absorbing device for arresting the motion of moving bodies. The energy absorbing device finds applications in personal fall protecting systems that protect workers against accidental falls. The invention also extends to a fall protection system incorporating the novel energy absorbing device.

BACKGROUND OF THE INVENTION

To prevent fatal injuries as a result of accidental falls, labour legislation codes require workers that perform a task on an elevated structure to wear a safety harness firmly attached to a fixture. In the event of an accidental fall, the safety harness is intended to arrest the falling movement at a safe distance above ground.

For an increased manoeuvrability it is common practice to tether the safety harness to a horizontal or a vertical safety track, such as a steel cable or a synthetic rope, among others, anchored to the structure on which the work is performed. The safety harness is freely displaceable along the track allowing the individual to walk around the work site without impairing the level of fall protection. In the event that a fall takes place the track anchors must generate the reaction force necessary to decelerate the human body to a stop.

The loading imposed on the various components of a fall protection system can be extremely severe especially in the case where several workers collectively fall. In order to buffer the loading, it is known to provide the fall protection system with an energy absorbing device that progressively dissipates the kinetic energy of the falling body.

The prior art discloses a variety of energy absorbers specifically designed for use in personal fall protection systems. The following patents are representative of state-of-the-art in this field.

| PATENT NUMBER AND COUNTRY | PUBLICATION DATE |
|---|---|
| U.S. 4,100,996 | July 18, 1978 |
| U.S. 4,446,944 | May 8, 1984 |
| U.S. 4,538,702 | September 3, 1985 |
| U.S. 5,174,410 | December 29, 1992 |
| U.S. 5,224,427 | July 6, 1993 |
| CANADA 2,039,004 | March 25, 1991 |

Most of the energy absorbers described in the prior art noted above, dissipate energy by inducing a controlled rupturing of a fibrous network. One approach consists of folding several times upon itself a strip made of non-stretchable woven fibers. The various plies of the strip are attached to one another by sacrificial links. The sudden tensile loading developed in a fall progressively breaks the links that provide a shock absorbing action. In a somewhat different approach, a pin is forced longitudinally through a strip of woven fibers to provide energy dissipation by producing a long and continuous rupture line in the fibrous material. The prior art also contemplates a non-destructive design that absorbs energy through frictional force developed when a length of synthetic webbing is pulled through a buckle.

The prior art energy absorbers noted above suffer from a variety of drawbacks. The designs utilizing sacrificial links provide merely an intermittent energy absorption effect. The force/deployment characteristics of this style of energy absorbers give rise to force spikes each time a link ruptures, followed by a relatively unimpeded deployment until the next link becomes loaded. The shock absorbers that use a pin destructively tearing synthetic webbing are efficient energy dissipators, however, their behaviour is largely dependent upon environmental conditions. For instance, the force necessary to induce deployment significantly varies between a dry webbing and a wet frozen webbing. Synthetic materials also have a limited lifespan when subjected to ultraviolet radiation such as sunlight. The same observations can also be made with regard to the energy absorbers based on frictional forces. Here, the behaviour of the device also depends upon the frictional/thickness properties of the webbing. A minor change in the friction properties could entail a significant variation in the deployment characteristics.

OBJECTIVES AND STATEMENT OF THE INVENTION

An object of the present invention is an energy absorbing device for decelerating a moving body that alleviates the drawbacks of the prior art.

Another object of the invention is a fall protection system incorporating the aforementioned energy absorbing device.

As embodied and broadly described herein, the invention provides a device for decelerating a moving body, comprising:

- a first load application site for connection to a support;
- a second load application site subjected to tensile loading upon interaction with the moving body; and
- an energy dissipating member of ductile material extending from said first load application site to said second load application site in a varying direction and being capable of absorbing energy upon application of a bending stress, said energy dissipating member having a cross-section of elongate shape circumscribing a compression zone and a tension zone separated from one another by a neutral line that extends longitudinally on said cross-section, application of a bending stress to said energy dissipating member compresses material in said compression zone, stretches material in said tension zone while material at said neutral line remains substantially unstressed, said zones having respective centroids separated by a distance exceeding $D/2.35$ where D is the maximal dimension of said cross-section measured orthogonally to said neutral line, whereby the tensile loading developed on said second load application site by said moving body induces a bending strain in said energy dissipating member, the bending strain causing a plastic deformation of said energy dissipating member that absorbs kinetic energy of the moving body.

The cross-sectional configuration of the energy dissipating member influences its ability to efficiently take-up the kinetic energy of the moving body. When the energy dissipating member bends the amount of material deformation in the tension zone increases with the distance from the neutral line. In other words a particle located far from the neutral line is stretched significantly more than a particle close to the neutral line. The energy absorbed in bending the energy dissipating member is the absolute summation of the mathematical product of the elongation on each particle of material in the cross-section times the stress of plastic yielding. This is mathematically equal to the yield stress times the volume of material undergoing the elongation times the distance of centroid of that volume of material from the neutral line, times the average elongation strain of the particles in the elongation zone plus the yield stress times the volume of material undergoing plastic shortening times the distance of the centroid of that volume from the neutral axis times the average shortening strain of the particles in the shortening zone.

The efficiency of the energy dissipating member to take-up energy is thus equal to the total energy absorbed (when the outer particles reach a predetermined limiting elongation) divided by the total volume of material. Thus the energy efficiency is mathematically proportional to the distance between the centroids of the elongation/compression zone from the neutral axis.

Energy dissipating members having cross-sectional shapes where the distance between the centroids of the tension zone and the compression zone exceeds D/2.35 are considered comparatively efficient and fall under the present inventive concept. Most preferably, the distance between the centroids substantially exceeds D/2. This cross-sectional configuration corresponds to a flat plate. By contrast, a perfectly circular cross-section, which is considered outside the scope of this aspect of the invention has an inter-centroid distance of D/2.356.

From a second aspect, the invention provides a device for decelerating a moving body, comprising:

a first load application site for connection to a support;

a second load application site subjected to tensile loading upon interaction with the moving body; and a hollow energy dissipating member (for the purpose of this specification the term "hollow" means an internal three-dimensional region substantially free of ductile material. This may be an empty cavity or a region containing material that exhibits non-ductile behaviour. The three-dimensional region can be continuous or discontinuous and can run longitudinally of the energy dissipating member or in another direction) of ductile material extending from said first load application site to said second load application site in a varying direction and being capable of absorbing energy upon application of a bending strain, whereby the tensile loading developed on said second load application site by said moving body induces a bending strain in said energy dissipating member, the bending strain causing a permanent deformation of said energy dissipating member that absorbs kinetic energy of the moving body.

A hollow energy dissipating member presents the advantage of concentrating a higher proportion of ductile material away from the neutral line in order to increase the amount of energy absorbed per unit of ductile material cross-section. As noted earlier, the ductile material in the vicinity of the neutral line absorbs a marginal fraction of the overall energy intake because it is stretched very little during the plastic deformation. By shifting this material toward the outer periphery, more energy (for a given degree of plastic deformation) is absorbed because an increased amount of material is being elongated during the bending process.

In one embodiment of the present invention the energy dissipating strip is made solely of ductile material such as steel or aluminium that absorbs energy when the bending strain creates a plastic deformation. In a variant, a compound energy dissipating strip is provided using a combination of ductile/non-ductile materials joined as co-extensive strips. The bending strain plastically deforms the ductile strip and also induces a fracture front in the non-ductile strip that progresses longitudinally as the energy dissipating member bends. The energy absorption capacity of the unit is depleted when the ductile material is deformed to the established limit and the non-ductile material is pulverized. The non-ductile material may be concrete or a polymeric material, among many others.

In a third aspect, the invention provides a device for decelerating a moving body, comprising:

a first load application site for connection to a support;

a second load application site subjected to tensile loading upon interaction with the moving body; and an elongated energy dissipating member of ductile material capable of absorbing energy upon plastic deformation, said energy dissipating member including first and second interconnected segments extending toward said first and second load application sites, respectively, to establish a continuous load transmission path between said sites, said segments being in a convolved condition (i.e. one segment wound upon the other), whereby the tensile loading developed on said second load application site by said moving body causes said segments to spread out and absorbs kinetic energy of the moving body.

In a fourth aspect, the invention provides an energy absorbing device deformable upon the application of kinetic energy in tension to spaced ends of the device, the device comprising:

an elongate member with a longitudinal axis extending centrally of its cross-section along its length;

the longitudinal axis throughout its length lying in a common flat plane;

the member is in any cross-sectional plane normal to its longitudinal axis along its length, symmetrical about an axis of symmetry lying in said any cross-sectional plane;

the member having a first end and a second end spaced from the first end with curved portions therebetween;

the curved portions comprising a plurality of curved segments with radii of the curved segments varying along the length of the member such that different segments plastically deform under different magnitudes of tension.

In a most preferred embodiment, the first and second segments have a common origin and are rolled together into a dual coil having a planar configuration, i.e. the central axes of the segments are co-planar. The free extremities of the segments that materialize the load application sites extend in opposite directions from the dual coil. Most preferably, the load application sites are on an imaginary line within the plane of the dual coil, the imaginary line passing through the centre of the dual coil. This feature enables the energy dissipating member to deploy straight when loaded and absorb energy in a predictable fashion.

The energy absorbing device embodied herein is particularly advantageous for use in the field of industrial protective equipment, For instance, the energy absorbing device can be incorporated in the horizontal or the vertical track of a fall protection system to which are tethered the individual safety harnesses.

BRIEF DESCRIPTION OF THE DRAWINGS

FIGS. 17, 18, 19, 20 and 21 show sequential steps in a method of making a device of the type illustrated in FIG. 5 with FIGS. 17 and 18 showing the clamping of a strip between clamp halves and FIGS. 19 to 21 showing the rotation of the strip clamped between the clamp halves relative to two fixed rods forming part of the forming apparatus;

DESCRIPTION OF PREFERRED EMBODIMENTS

Figure 1:
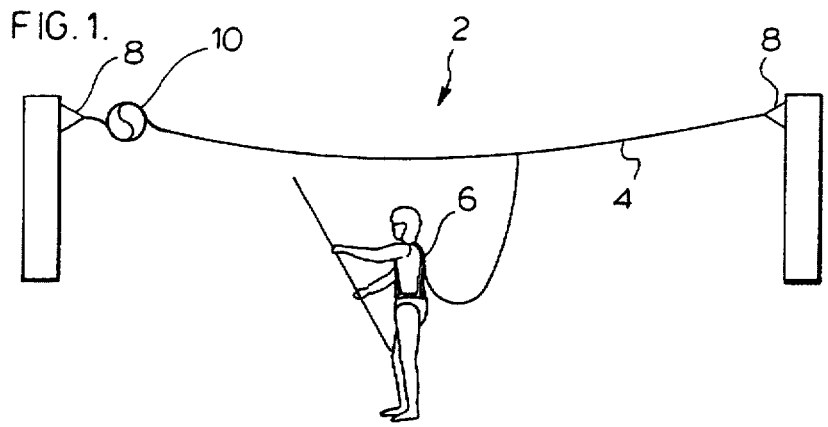
FIGS. 1 and 2 are generalized graphical illustrations of personal fall protection systems using an energy absorber in accordance with the present invention.

FIG. 1 depicts a personal fall protection system incorporating an energy absorbing device in accordance with the invention. The fall protection system 2 includes a horizontally extending safety track 4, in the form of a metal or synthetic cable, along which are displaceable the safety harness 6 of an individual worker. The safety track is anchored securely to the elevated structure on which the work is being performed with anchoring brackets a of sufficient strength to withstand the forces developed in the event of a fall. In order to greatly reduce these forces and provide a gradual deceleration of the falling human body, an energy absorbing device designated comprehensively by the reference numeral 10 is connected between the extremity of the safety track 4 and one or both of the anchors 8.

Figure 2:
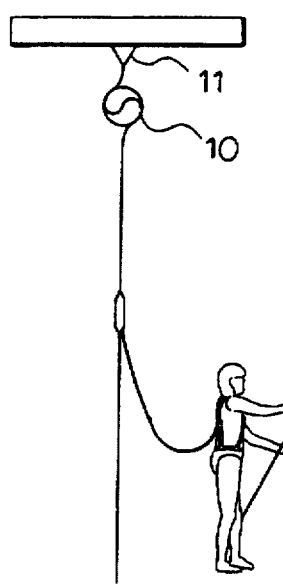

FIG. 2 illustrates a variant of the fall protection system 2, where the track has a vertical configuration. The energy absorbing device 10 is connected between the track and a suspension point 11.

Figure 4:
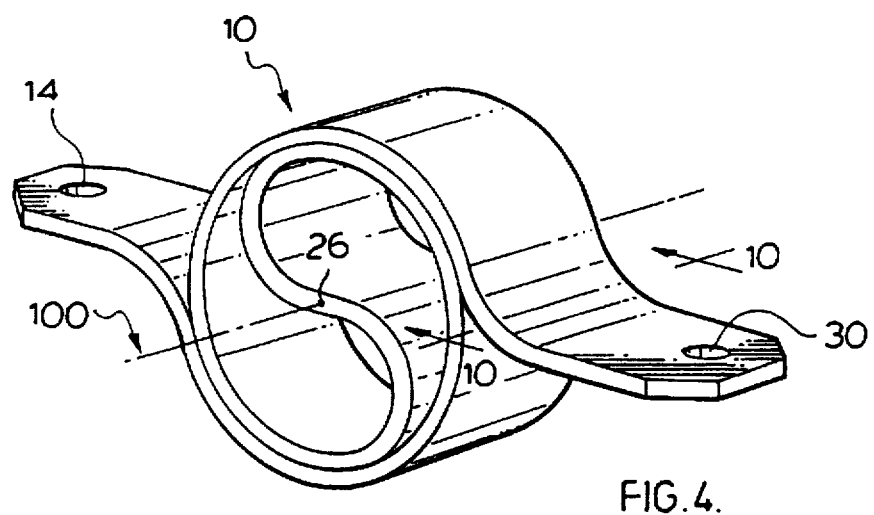
FIG. 4 is a perspective view of an energy absorber in accordance with the present invention.

Referring now to FIG. 4, the energy absorbing device comprises a strip 12 of ductile material. As seen in FIG. 4 on one side view, the elongate member 12 has a central portion 109 of generally "S" shape. This S-shaped central portion may be seen to comprise the portion 109 of the elongate member 12 which extends between approximately point 101 and point 102. As seen in FIG. 4, one first end of the central "S" shape (as shown in FIG. 4 the lower end) merges into a respective first clockwise curving portion 112. Similarly, the other second end of the central "S" shape (in the case of FIG. 4 the upper end) merges into a respective second clockwise curving portion 113. The first clockwise curving portion 112 may be seen to extend curving clockwise from point 102 to point 104. The second clockwise curving portion 113 may be seen to extend curving clockwise from point 101 to point 103. In this manner, a first end of the "S" shape merges into its respective clockwise curving portion 112 with the clockwise curving portion 112 extending curving clockwise to overlie initially the other, second end of the "S" shape and subsequently the other, second clockwise curving portion 113. Similarly, the second end of the "S" shape merges into its respective second clockwise curving portion 113 which extends curving clockwise to overlie initially the first end of the "S" shape and subsequently the other first clockwise curving portion 112.

The first clockwise curving portion 112 terminates as a respective first end portion 114 extending from point 104 to point 108. The second clockwise curving portion 113 terminates as a respective second end portion 115 extending from point 103 to point 107. Aperture 34 in first end portion 114 provide an attachment member at the first end of the elongate member 12 and aperture 14 in second end portion 115 provides an attachment member at the other second end of the elongate member 12.

FIG. 4 shows that the central portion 109 of "S" shape is formed of two halves 110 and 111, each of which are of "C" shape. First half 110 extends from center point 26 to point 101. The second half extends in the opposite direction from center point 26 to point 102. The two halves are thus joined at point 26 through which a center axis 100 passes. It may be seen that in side view as seen in FIG. 4, each half 110 and 111 is located in an identical orientation to the other half but rotated 180° about the center axis 100. It may be also seen that each of the clockwise curved portions 112 and 113 is of identical shape to the other of the clockwise curved portions and in a side view as seen in FIG. 4, each clockwise curved portion 112 and 113 is located in identical to the other clockwise curved portion but rotated at 180° about the center axis 100.

As seen in FIG. 4, first end portion 114 has a first terminal section 116 between points 106 and 108 which is substantially planar as seen in side view. Similarly, second end portion 115 has a second terminal section 117 between points 105 and 107 which in side view is planar. As well, FIG. 4 shows that a planar line can extend centrally through each of terminal portions 116 and 117 and through center axis 100.

Figure 5:
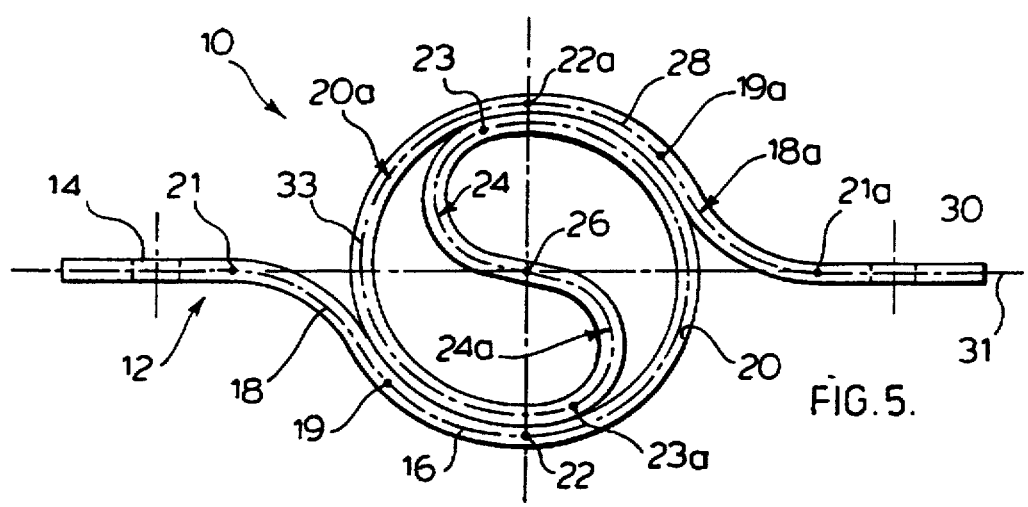
FIG. 5 is a side elevational view of the energy absorber shown in FIG. 4.

It is seen in FIG. 4 that each end portions 114 and 115 are located diametrically opposite to the other of the end portions Reference is now made to FIG. 4 in conjunction with notably FIG. 5 which describes strip 12 in accordance with a different characterization of segments of the strip 12.

Figure 6:
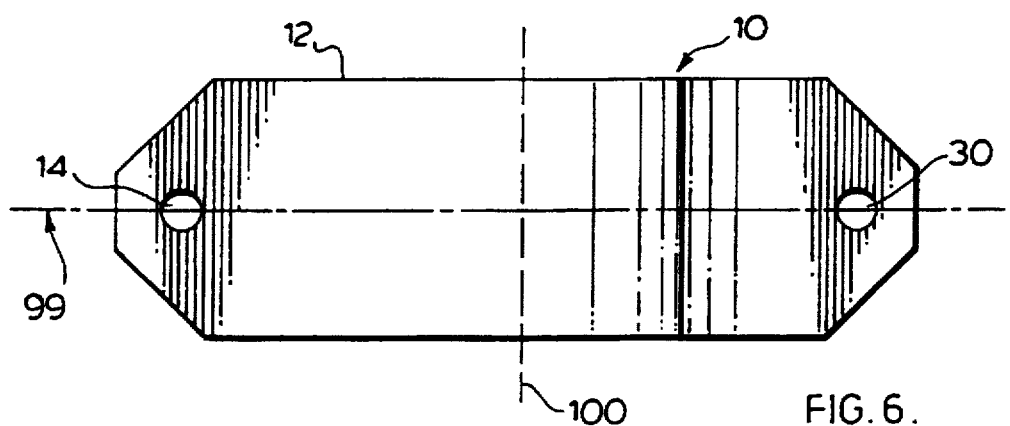
FIG. 6 is a bottom plan view of the energy absorber shown in FIGS. 4 and 5.

Referring to FIGS. 4, 5 and 6, the energy absorbing device 10 comprises a strip 12 of ductile material having at one end an aperture 14 constituting a first attachment point of the energy absorbing device. The strip 12 includes a first curved segment 16 of stepwise decreasing radius originating near the aperture 14. Segment 16 extends from location 21 to location 26. The segment 16 has an initial bend 18 of inverted S-shape which extends from location 21 to location 22. The bend 18 merges with a significantly longer intermediate bend 20 which extends from location 22 to location 23. The curved segment 16 ends with a terminal bend 24 that originates at location 23 and ends at 26 location which coincides with the geometrical centre of the strip 12.

The two curved sections forming the bend 18 of inverted S-shape have the same radius. The bend 20 has a constant radius that is smaller than the radius of the curved sections of the bend 18. In a similar fashion, the bend 24 has a constant radius that is smaller than the radius of the preceding bend 20, The remaining portion of the strip 12 is constituted by a second curved segment 28 originating at location 26 and terminating at an opening 30 constituting the other attachment point of the energy absorbing device 10. The second curved segment 28 is the same geometrical shape as first curved segment 16 but rotated by 180° about a central axis (shown as 100 in FIG. 4) extending through point 26 normal to the cross-section seen in FIG. 5. The bends forming the second curved segment 28 are identical to those of segment 16 and are identified by the same reference numerals followed by the suffix "a"

The segments 16 and 28 are wound in a dual concentric coil with the apertures 14 and 30 constituting the load application sites and attachment points of the energy absorber extending on either side of the coil. It will be noted that attachment points 14 and 30 are centred on an imaginary horizontal line 31 intercepting the centre point location 26 of the coil. The imaginary line 31 lies in a vertical plane (shown as 99 in FIG. 10) containing the centre line 33 of the strip 12 (shown in FIG. 10). The special relation between attachment points 14, 30 establishes a line of deployment of the strip 12 that is co-linear with the tensile vectors acting on the energy absorbing device 10 in the event of deployment. This feature allows the energy absorber to spread out straight from both ends in a stable and highly predictable manner so as to achieve a controlled energy dissipation, as discussed in detail below.

The tensile loading developed in the case of a fall pulls apart the attachment points 14 and 30. The resulting bending strain induced in both curved segments 16 and 28 unwinds the dual coil by progressively straightening the bends of the curved segments. If the strip 12 has a constant thickness and width, the rate of energy dissipation is staged due to the increasingly tighter radius of the successive bends. Stated otherwise, the amount of energy required to unwind the strip 12 by a predetermined amount is lower when the bends 20 and 20a are straightened than when the smaller radii curves 24 and 24a straighten. This feature provides the shock absorber with the ability to take-up at an increasingly higher rate the kinetic energy of the moving body as the extent of the deployment stroke increases.

Figure 10:
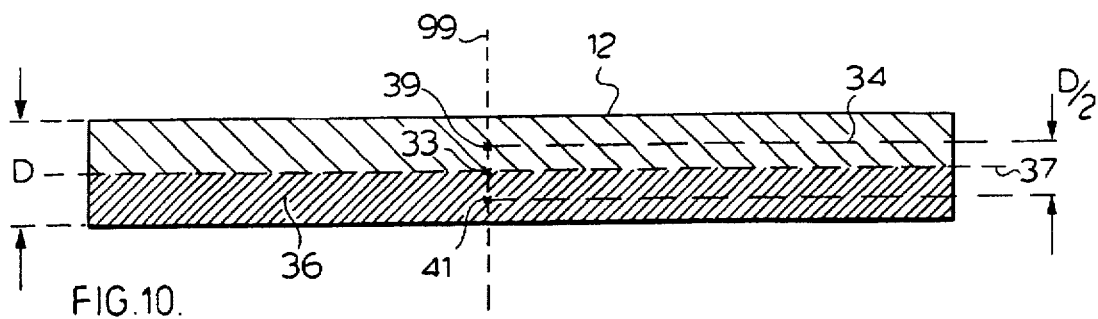
FIG. 10 is a cross-sectional view taken along lines 10—10 in FIG. 4.

Reference is now made to FIG. 10 which shows a cross-sectional view of the device of FIG. 4 along section line 10-10'. FIG. 10 shows as 33 the location of a centre line and longitudinal axis of the strip which extends centrally of the cross-section of the strip along its length. In the context of the strip 12 which is a straight, flat member of uniform rectangular cross-section prior to forming into the coil shown in FIG. 5, this longitudinal axis 33 would be a straight line extending longitudinally through the strip. In the context of the coiled device 10 shown in FIG. 5, the axis 33 is shown as a dotted line centrally of the strip 12. The strip 12 is formed such that the longitudinal axis 33 of the device shown in FIG. 5 lies in a common flat plane indicated as 99 in FIGS. 10 and 6.

FIG. 5 shows location 26 as the centre of the coiled device 10. FIG. 4 illustrates a central axis 100 which extends through location 26 normal to longitudinal axis 33 and normal to common flat plane 99. As pointed out earlier, the first curved segment 16 and the second curved segment 28 are substantially identical but displaced 180° relative to each other about central axis 100.

In the device of FIG. 5, the strip 12 has a regular rectangular cross-section as seen in FIG. 10. With such a strip 12, it will be apparent that in any cross-sectional plane normal to the longitudinal axis 33, the strip will be symmetrical about an axis of symmetry lying in that cross-sectional plane. Thus, in the context of FIG. 10, the strip in the cross-section shown normal to axis 33, the strip is symmetrical about an axis of symmetry lying in the cross-sectional plane and lying in common central plane 99.

Figure 7:
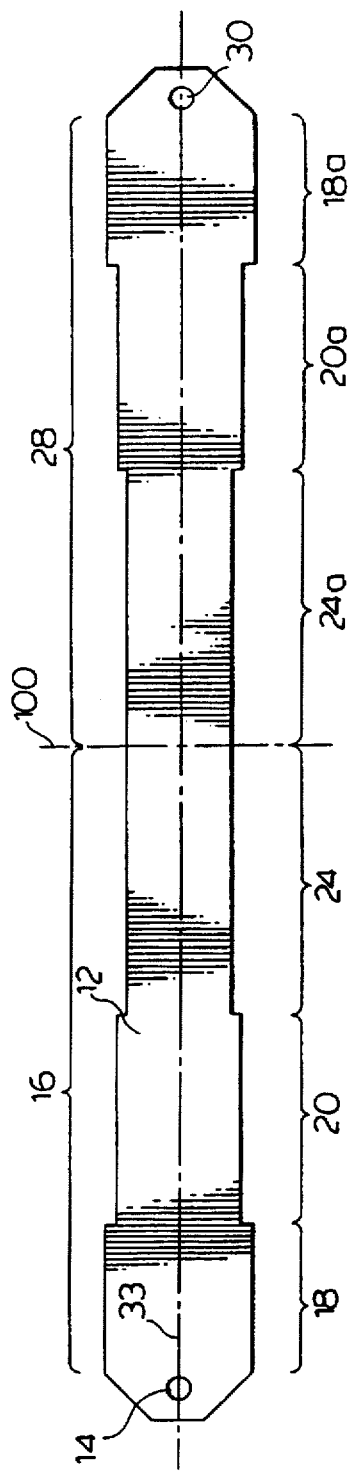
FIG. 7 is a top plan view of an energy dissipating strip suitable for manufacturing the energy absorber of FIGS. 4, 5 and 6, the strip having discrete cross-sectional area variation.
Figure 8:
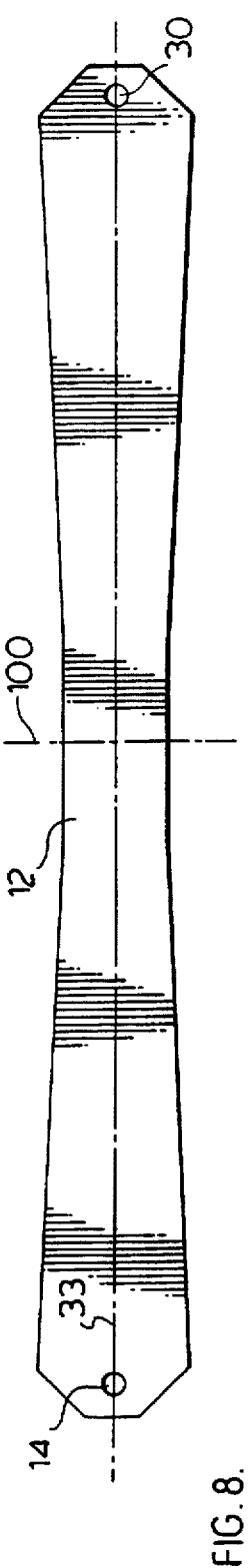
FIG. 8 is a top plan view of the energy dissipating strip according to a first variant, the strip having a continuous cross-sectional area variation.
Figure 9:
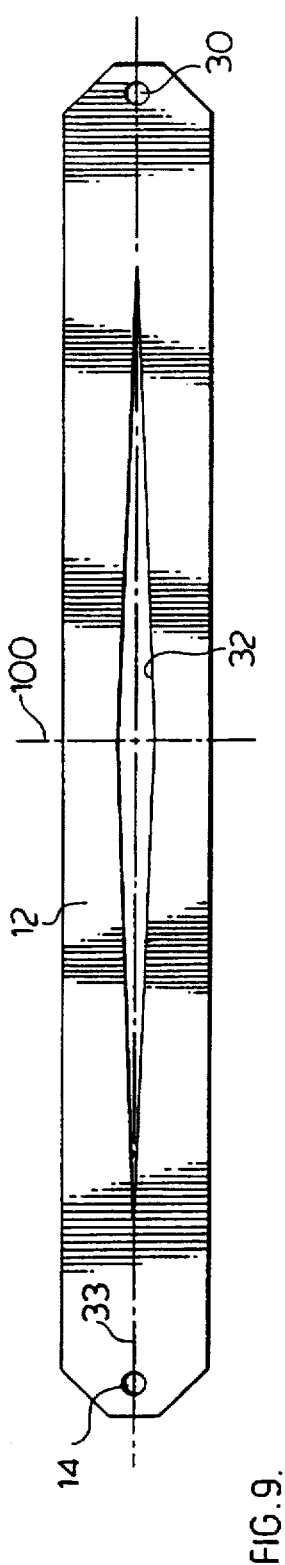
FIG. 9 is a top plan view of the energy dissipating strip according to a second variant, the strip having a continuous cross-sectional area variation.

For applications in which it is desirable to maintain a generally constant deployment force during the entire extension stroke of the energy absorbing device 10, the embodiments shown in FIGS. 7, 8 and 9 can be used. In FIG. 7, the effect of the tighter radius on the magnitude of bending strain required to produce a plastic deformation is muted by diminishing the cross-sectional width of the strip 12. More specifically, the strip 12 has a discrete variation of its transverse dimension, the variations occurring at the boundaries between the initial, intermediate and terminal bends of each strip. This embodiment is most suitable where the radius of the bends varies discretely, as in the embodiment of FIGS. 4 to 6.

FIG. 8 depicts an embodiment characterized by a continuous transverse dimension variation. This feature is suitable for a strip 12 having a radius that diminishes continuously from one attachment point toward the geometric centre of the dual coil. FIG. 9 is a variant where the continuous cross-sectional reduction near the centre of the strip 12 is achieved by stamping out a slot 32 that tapers toward the anchoring points 14,30.

FIG. 10 illustrates the bending strains induced in the strip 12 when the energy absorber device 10 is subjected to tensile loading. Essentially, the cross-section of the strip 12 is divided in two zones: zone 34 subjected to tension and zone 36 undergoing compression. The zones 34 and 36 are separated by a neutral line 37 coinciding with the longitudinal axis of the cross-section. When the strip 12 is plastically deformed the ductile material in tension zone 34 is stretched by an amount depending upon the distance from the neutral line 37. For instance, a particle on the surface of the strip elongates significantly more than a particle located near the neutral line 37. Note that particles at the neutral line remain totally unstressed during bending of the strip 12.

Figure 11:
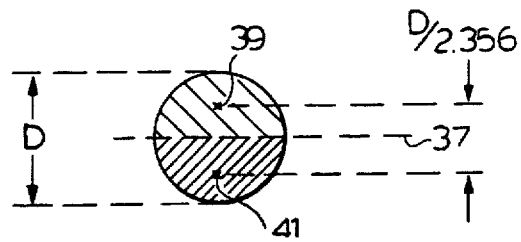
FIG. 11 is a cross-sectional view of an energy dissipating member having a circular configuration.

The present inventor has made the unexpected discovery that the energy absorption efficiency of the energy absorber device 10 is dependent upon the cross-sectional configuration of the strip 12. As discussed previously, the energy absorption efficiency is proportional to the distance separating the centroids of the tension zone 34 and the compression zone 36. In FIG. 11, the centroids are designated by reference numerals 39 and 41. The distance separating the centroids 39 and 41 can be expressed as a proportion of the maximal transverse dimension D (the dimension measured orthogonally to the neutral line 37). The rectangular section such as shown in FIG. 10 has an inter-centroid distance of D/2.

Figure 12:
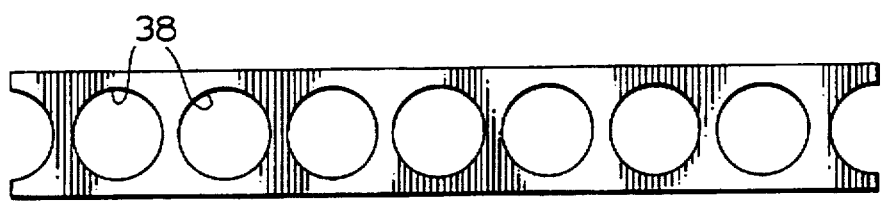
FIG. 12 is a cross-sectional view of the energy dissipating strip in accordance with a further variant.

FIG. 12 illustrates a circular cross-sectional shape that is less efficient than the rectangle. It can be mathematically demonstrated that the inter-centroid distance for the circular configuration is D/2.356. For a given bending curvature and for a given cross-sectional area, the rectangular strip having an inter-centroid distance of D/2 will absorb about 18% more energy than the circular strip.

According to the invention, the cross-sectional configuration of the strip 12 is such that the distance between the centroids preferably exceeds D/2.35, more preferably D/2.2 or D/2.1. A configuration providing an inter-centroid distance not substantially less than D/2 is preferred since such a configuration closely corresponds to a rectangular section as shown in FIG. 10. Preferably, a configuration provides an inter-centroid distance of equal to or less than about D/2.0.

To further increase the efficiency of the ductile material in absorbing energy, designs are considered where the area in the vicinity of the neutral axis is devoid of ductile material. Such devices can absorb a higher amount of energy for a given cross-sectional area of material and a given amount of plastic deformation than solid shapes. By shifting the bulk of the material away from the neutral axis, a greater proportion of the available material undergoes an appreciable stretching which translates in a higher energy intake. Energy absorbers in which the degree of bending allowed before depleting the energy absorption capacity is fixed by elongation, could benefit from this innovative approach. For instance, consider the case of the energy absorbing device 10 that takes-up energy while it deploys. Once the strip 12 is totally flattened, i.e. it has been straightened out, very little energy will be further absorbed in bending. If desired to increase the energy absorption capacity for the same amount of ductile material, one could either re-design the geometrical configuration of the device in order to increase the proportion of material that achieves the limiting of plastic deformation or substitute a hollow strip (while maintaining an identical cross-sectional area) without altering any other factors. The latter approach is simpler and elegant.

Alternatively, device efficiency could be increased while maintaining the same development force, overall stroke and total energy absorbing capability by utilizing a hollow strip that achieves the same ductile bending strength as the solid plate, but has the advantage of using less material.

Figure 13:
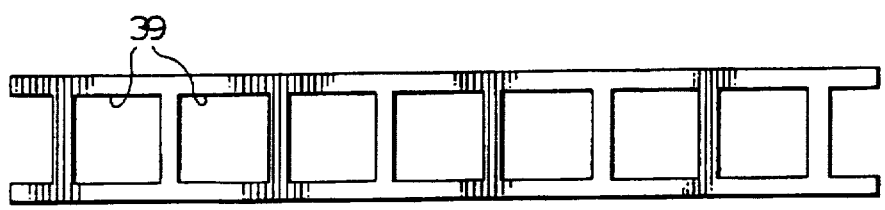
FIG. 13 is a cross-sectional view of the energy dissipating strip in accordance with another variant.

Cross-sectional shapes that embody the concept described above are shown in FIGS. 12 and 13. In FIG. 13, the strip displays a plurality of elongated cylindrical cavities 38 that are parallel and spaced along the longitudinal axis of the strip. The variant in FIG. 13 has internal rectangular cavities 39. The relative sizes of the cylindrical cavities 38 in FIG. 12 or the rectangular cavities 39 in FIG. 13 could be varied along the length of the strip as desired.

It could also be envisaged to fill the internal cavities 38,39 with substantially non-ductile material that would crack during bending. The progressive pulverisation of the non-ductile material would further increase the energy absorption capacity. The non-ductile material can be any suitable substance that cracks instead of plastically deforming, such as synthetically prepared rigid resinous material, among many others.

Figure 15:
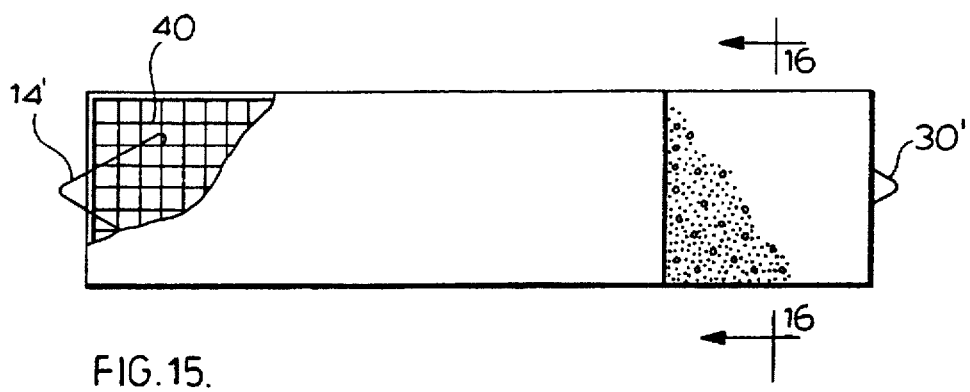
FIG. 15 is a bottom elevational view of the energy dissipating strip of FIG. 14.
Figure 16:
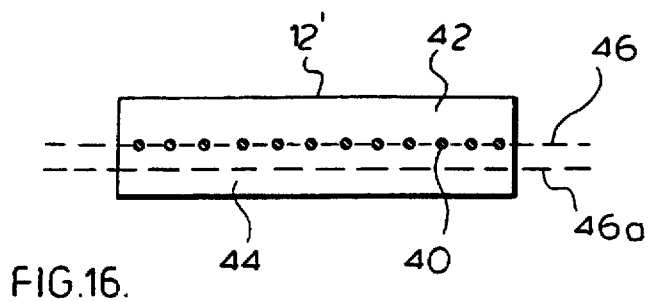
FIG. 16 is a cross-sectional view taken along lines 15—15 in FIG. 15.

For applications requiring a large energy absorption capacity the embodiment illustrated in FIGS. 15 and 16 could be employed. The energy absorber device 10' is constituted by a strip 12' in the dual coil configuration made of composite material. More particularly, the strip 12' includes a network of reinforcing metallic wires 40 perpendicularly crossing each other. The wires 40 may be welded wire mesh or reinforcing bars typical for usage in reinforced concrete constructions. The wires 40 are embedded in a matrix of binding agent such as ordinary concrete consisting of graded aggregates and Portland cement. For increased efficiency in energy absorption per volume of wire materials, the short, straight wires nay be significantly smaller than the main wires following the coiled shape since the transverse wires only serve to hold the absorber together during deployment and cracking of the matrix and do not directly contribute to the energy absorption.

Anchoring points 14' and 30' are provided at the extremities of the strip 12 in the form of wires with hook ends that mechanically interlock with the network of crossing wires 40 and are partially embedded in the matrix of bonding agent.

Figure 14:
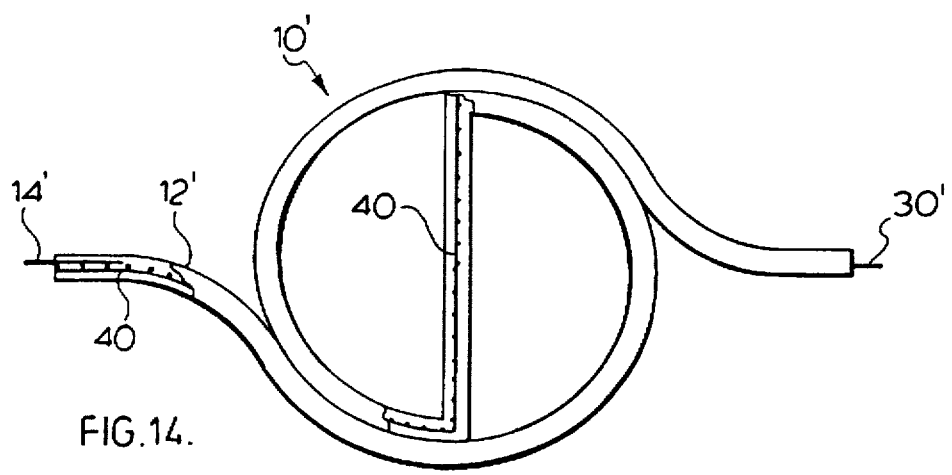
FIG. 14 is a side elevational view of the energy dissipating strip in accordance with yet another variant.

When the attachment points 14' and 30' are pulled apart, a bending strain is induced in the strip 12'. This is best shown in FIG. 16. The bending strain creates a tension zone 42 and a compression zone 44 separated by a neutral axis 46. The wires 40 may be located exactly at the neutral axis, hence in the initial stages of the tensile loading they remain substantially unstressed. Note, however, that the wires 40 may be moved higher in the tension zone 42 if the thickness of the section permits. When the bending strain exceeds the elastic limit of the bonding agent in zone 42, the latter cracks which has the effect of dissipating energy. Since the cracked material can no longer offer a meaningful reaction force to the tensile loading the neutral axis shifts to a new position 46a. The resulting balance of forces causes the wires 40 to stretch, thereby energy is now absorbed by virtue of plastic deformation. One design alternative of the device of the type illustrated in FIG. 14 is to have the reinforcing wires located within the device in locations other than the centre plane indicated as 46 in FIG. 15, dependant upon the relative position along the length of the member. For example, the reinforcing wires could be placed nearer to surfaces which are radially interior surfaces. Thus, the location of the wire would change depending upon which half of the device the wire is located in.

The ductile material used in any one of the embodiments illustrated in FIGS. 1 to 36 is preferably a metal such as structural steel, stainless steel, aluminum, copper, titanium or any other suitable pure metal or alloy that exhibits ductile behaviour.

Reference is made to FIGS. 17 to 21 showing sequential steps in a method of making an energy absorbing device 10 as illustrated in FIG. 5 with a preferred apparatus.

Figure 17:
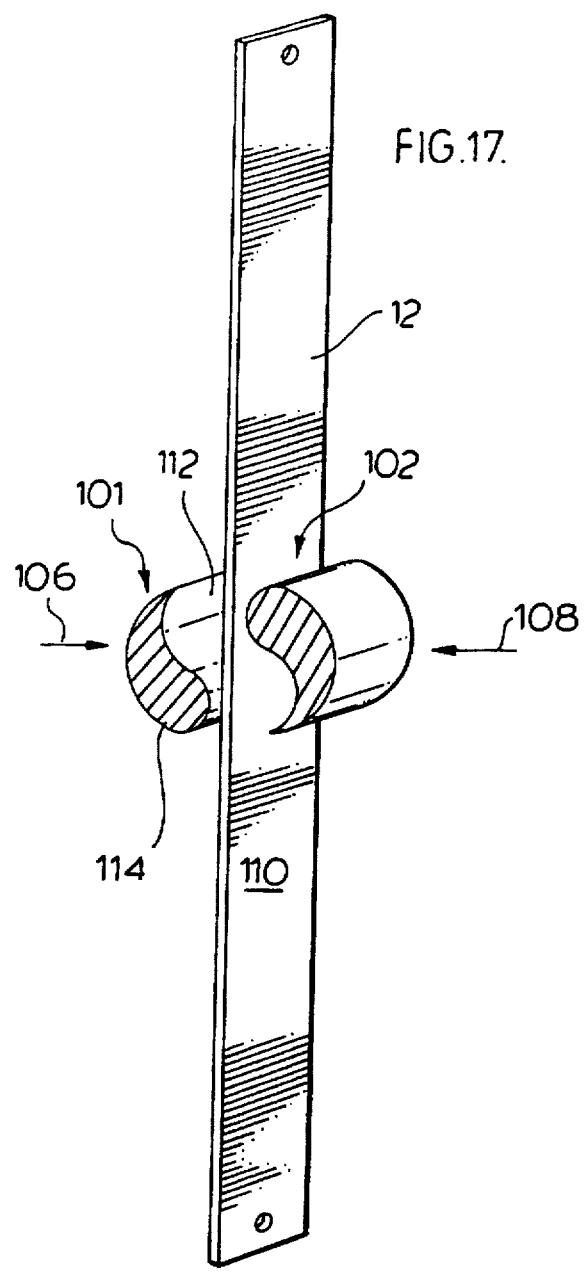
Figure 18:
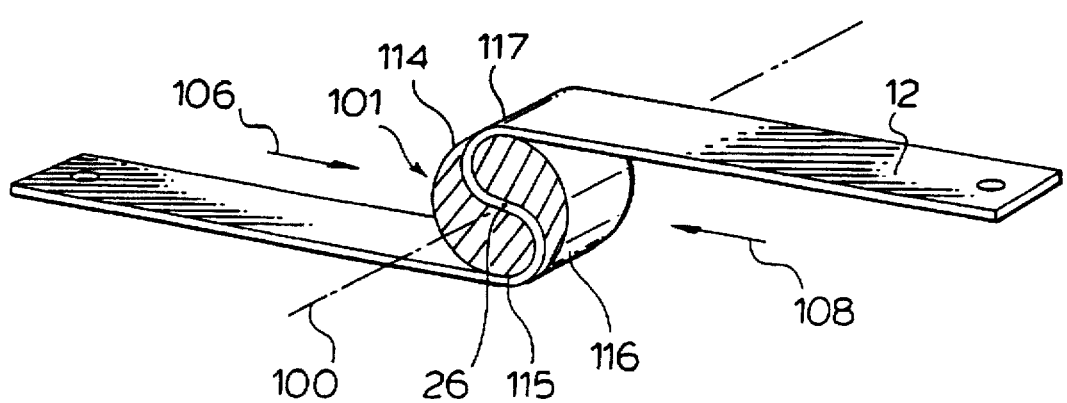

The apparatus comprises firstly, two clamp halves 101 and 102. In a first step as seen in FIG. 17, a straight elongate length of strip 12 of ductile material having a rectangular cross section is located between the two clamp halves 101 and 102. The clamp halves are then forced together in the direction indicated by arrows 106 and 108 in FIGS. 17 and 18 so as to deform the strip 12 to the shape as shown in FIG. 18 by reason of the strip being engaged by the interior S-shape surfaces 110 and 112, respectively of each clamp halves. The clamp halves 101 and 102 are secured together by means not shown clamped about the strip 12 in the position shown in FIG. 18.

Next, the metal strip 12 with the clamp halves 101 and 102 clamped about it are disposed within an apparatus such that the clamp halves are journalled for rotation about a central axis indicated as 100 which passes through centre point 26 and which axis is maintained fixed relative to fixed cylindrical forming rods 104 and 106 which are disposed fixedly located parallel to centre axis 100 and equidistant on diametrically opposite sides therefrom.

From the position shown in FIG. 19, the clamp halves are rotated counterclockwise by means not shown about central axis 100 thereby rotating from the position of FIG. 19 to the position of FIG. 20 and then subsequently to the position of FIG. 21. In rotating from the position of FIG. 19 to the position of FIG. 20, the strip is deformed to conform to the outside surfaces 114 and 116, respectively, of the clamp halves 101 and 102.

FIG. 20 illustrates a position in which the clamp halves have been rotated about 140° from the position of FIG. 19. FIG. 21 indicates a position which the clamp halves have been rotated about 230° from the position of FIG. 19.

In the context of the apparatus such as schematically shown in FIGS. 17 to 21, the shape of the clamp halves 101 and 102 determines the configuration of the resultant device. As shown in FIG. 18, the clamp halves when clamped together with the strip 12 therebetween present their outer surfaces 114 and 116 at a constant radius from central axis 100 so as to present a cylinder about which the strip is wound at a constant radius for each approximate incremental 180° of rotation from the position of FIG. 19. In rotating from the position of FIG. 19 to the position of FIG. 20, the strip assumes a constant radius cylindrical curved section. However, shortly after rotation from the position shown in FIG. 20, the radius increases at a relatively abrupt step discontinuity to a curvature increased in radius by the thickness of the strip 12. The strip then for the next approximate 180° of rotation has this fixed enlarged radius of curvature where it overlaps on a curved portion of the nested, underlying other half of the strip.

It is to be appreciated that the outer surfaces 114 and 116 of the clamp halves may be provided with other configurations than that which provides a cylinder when they are clamped together. For example, an other preferred configuration is to provide a surface which increases with radius from the centre 26 an amount equal to the thickness of the strip from the point indicated as 115 in FIG. 18 to the point indicated as 117 in FIG. 18 so as to permit the strip 12 to wind in a helical manner with a constantly increasing radius initially upon the outer surfaces of the clamp halves and subsequently upon the underlying nested curved portions of the other halves of the strip. Such a device with a smoothly helically wound strip would have an appearance similar to that shown in FIG. 21 and therefore is not separately illustrated.

The inner surfaces 110 and 112 of the clamp halves may also assume other configurations as may be desirable.

It is to be appreciated that the clamp halves may be rotated about the central axis 100 to desired amounts of rotation which may be in the range of from about 30° to many full revolutions, for example, 3, 4, 5 or 6 for revolutions. More preferably, the rotation will be in the range of 90° to about 540° and more preferably at least 180°, 270°, 360°, 450° or 540°.

The device shown in FIG. 21 has the ends 119 and 121 of the strip 12 extending straight as a tangent to where the curved portion of the strip 12 last curves about the other half of the strip. The device shown in FIG. 21 can have each of the straight ends 119 and 121 formed into a general S-shape so as to provide a device the same as that shown in FIGS. 4 and 5. It is not necessary however to have the ends or each of them formed into the S-shape shown in FIGS. 4 and 5.

Figure 22:
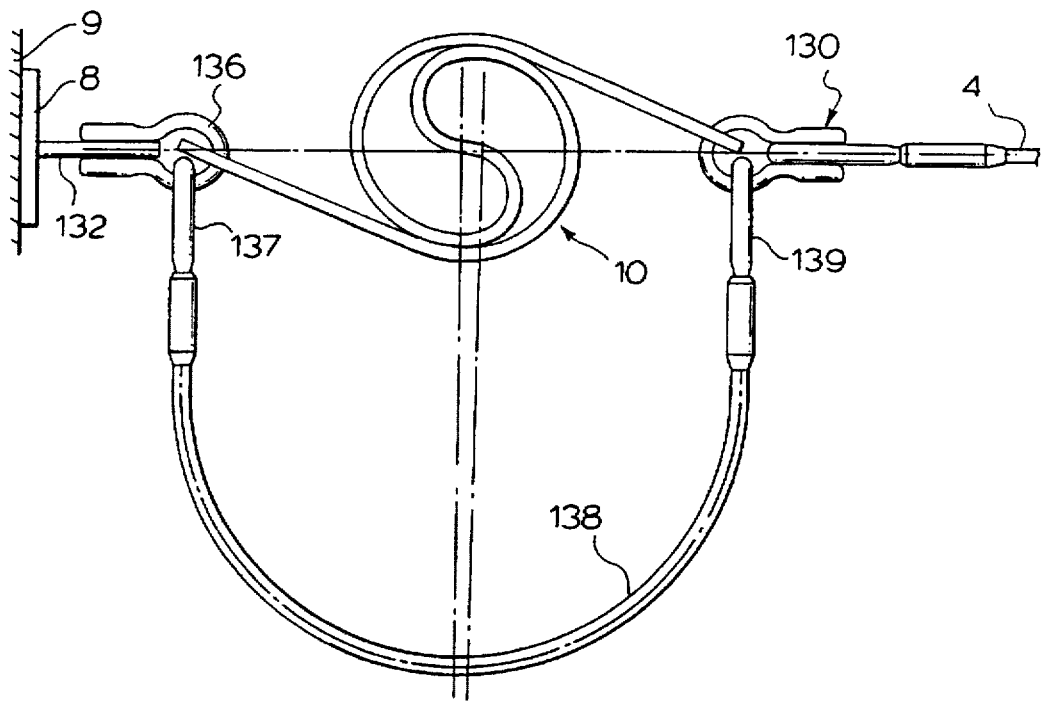
FIG. 22 shows a side pictorial view of one end of a fall protection system similar to that shown in FIG. 1 and including both an energy absorption device and a secondary safety cable.
Figure 23:
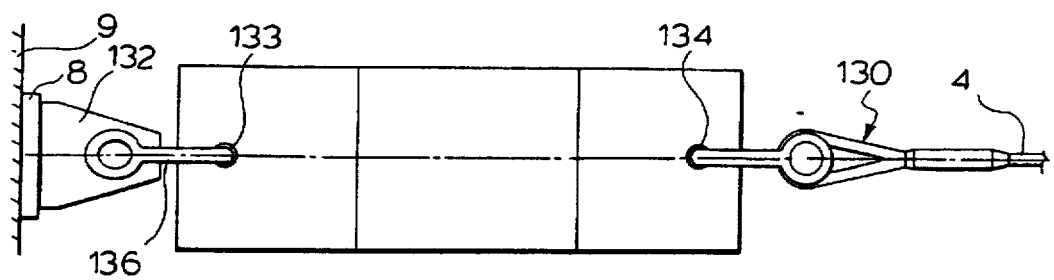
FIG. 23 shows a top pictorial view of the fall protection system of FIG. 19.

FIGS. 22 and 23 show side and top views of a portion of a fall protection system similar to that shown in FIG. 1 and including an anchor 8 secured to a structure 9 and a horizontally extending safety track in the form of a steel primary cable 4 with a shackle 130 secured to its end. The anchor 8 comprises a bracket with a flange 132 having an opening to receive the bolt holding the ends of a second shackle 136. The shackles 130 and 136 each engage attachment openings 133,134 in the ends of the energy absorption device 10 and as well loops 137,139 at each end of a secondary steel cable 138. The secondary steel cable 138 while not necessary, if provided is preferably of a length of approximately equal to that of the energy absorption device 10 should it have its strip 12 fully extended. The cables 4 and 138 ensure a maximum design load bearing capability greater than that of the energy absorbing unit. The energy absorbing unit 10 is shown as identical to that in FIG. 21.

Reference is now made to FIGS. 24 to 31 which schematically show a second method and apparatus for making the energy absorbing device as illustrated in FIG. 5. In FIGS. 24 to 31, the strip is illustrated in side view for convenience as a single solid line.

Figure 24:
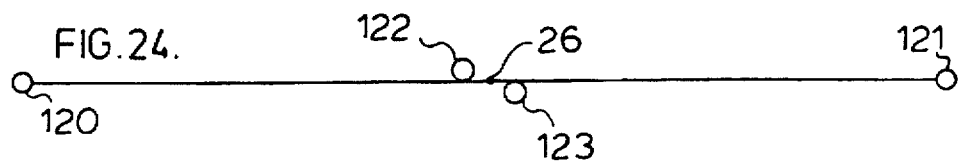
FIGS. 24, 25, 26, 27, 28, 29, 30 and 31 schematically show sequential steps in a second method and apparatus for making an energy absorbing device of the type illustrated in FIG. 5.
Figure 25:
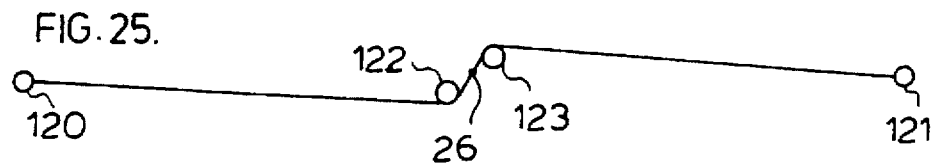
Figure 26:
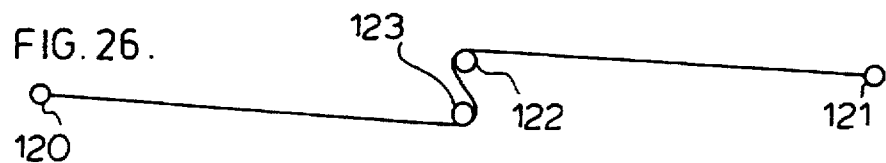
Figure 27:
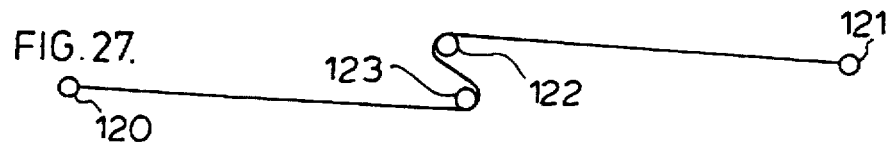
Figure 28:
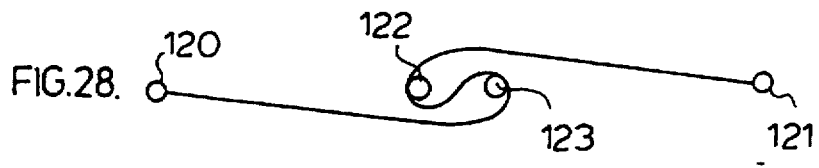
Figure 29:

The apparatus shown in FIGS. 24 to 31 has two end clamps 120 and 121 only schematically shown which are to engage and hold the ends of the strip. The apparatus also includes two cylindrical pins 122 and 123 which are disposed equidistance from the centre 26 of the strip with the pins coupled together by means not shown for rotation in unison about centre 26 maintained a constant distance from the centre. Each of the clamps 120 and 121 are movable along a straight track (not shown) which is fixed and extends from the position of the clamp 120 to the position of clamp 121 as shown in FIG. 24 through centre 26. The movable clamps 120 and 121 are moved towards centre 26 by the apparatus along the track by means not shown as the pins 122 and 123 rotate. The movement of each of the clamps is controlled as a function of the extent of rotation of the pins 122 and 123 from the starting position shown in FIG. 24. Thus, the clamps 120 and 121 permit a control winding of the strip 12 about the pins 122 and 123 so as to provide various advantageous shapes and configurations for the resultant convoluted coil.

As shown, in progressing in sequence from FIG. 24 successively through FIGS. 25 to 31, the pins 122 and 123 are rotated in unison counterclockwise about centre 26 and the end clamps 120 and 121 are moved progressively towards the centre 26.

Figure 32:
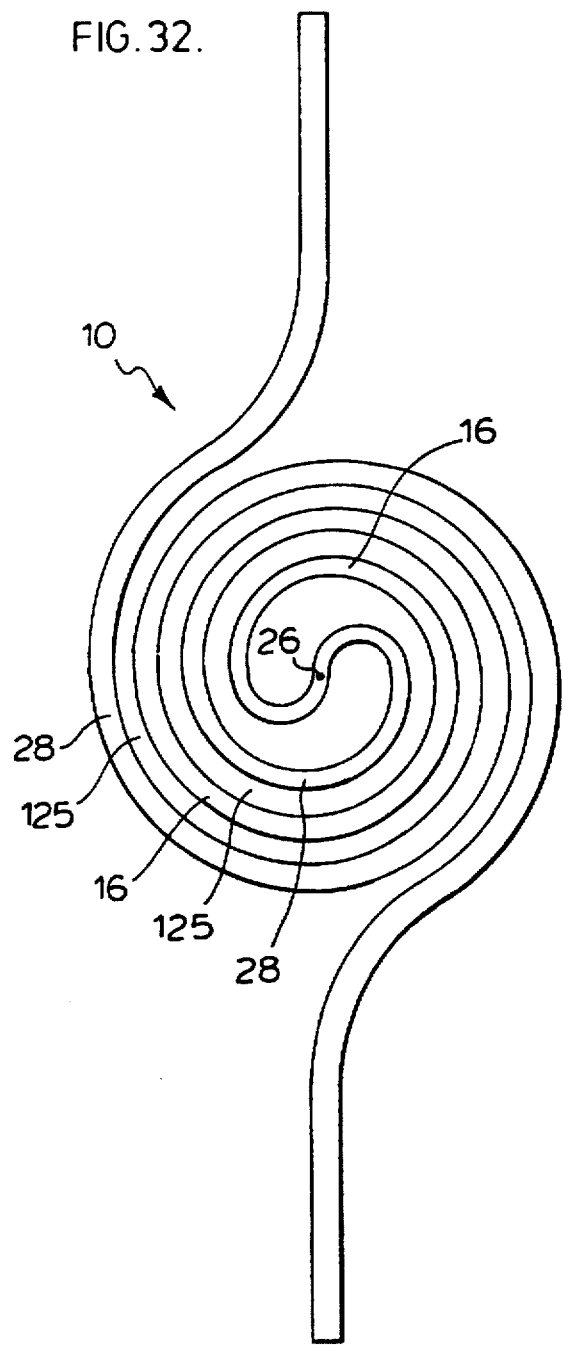
FIG. 32 is a cross-sectional view of the energy dissipating strip in accordance with another convoluted coiled variant.

Reference is now made to FIG. 32 which shows another variant of an energy absorbing device 10 in accordance with the present invention. The device 10 shown in FIG. 32 could be formed with the apparatus of FIGS. 24 to 31. The device in FIG. 32 is shown with a continuous air space 125 separating the first curved segment 16 from the second curved segment 28.

The coil shown in FIG. 32 differs from the coil shown for example in FIG. 5 insofar as the thickness of the strip 12 decreases from its centre 26 progressively to each end. This decrease in the thickness along the length of the strip permits the thickness to vary with radius so as to keep the force required to extend the device 10 substantially constant throughout its elongation as may be advantageous for some applications. The device of FIG. 32 may be formed from a strip 12 of metal whose thickness has been varied as by rolling the metal plate to the desired varying thickness prior to coiling. While FIG. 32 shows the thickness progressively increasing towards centre 26, the thickness may be varied in other manners.

The device of FIG. 32 may also be formed from ductile extrudable materials such as aluminum by extruding the device through a dye which has a cross-section which is the same as the cross-sectional profile shown in FIG. 32 and then cutting the extrusion at desired widths according to desired deployment forces. Extruding the energy absorber may be particularly advantageous insofar as the energy absorber may be desired to fit into specially designed casings or the like as may be useful for applications such as in retaining automotive seat belts in substitution for devices such as those taught by U.S. Pat. Nos. 4,358,136 and 3,482,827.

Figure 33:
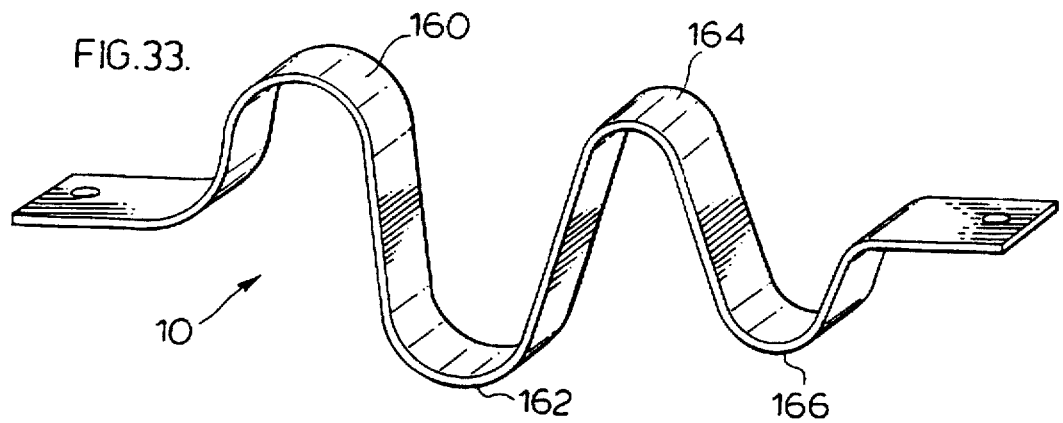
FIGS. 33, 34, 35 and 36 are pictorial side views of four further variants of energy dissipating strips in accordance with the present invention.

Reference is now made to FIGS. 33 to 36 which illustrate further embodiments of energy absorbing device 10 in accordance with the present invention. Each of FIGS. 33 to 36 shows a ductile strip 12 of rectangular cross-section similar to that shown in FIG. 6. Each device 10 has curved sections between its two ends. FIG. 33 shows a strip 12 configured to have a curved section of generally sinusoidal configuration having a first wave with upper peak 160 and lower peak 162 of the same height and a second wave having peaks 164 and 166 of equal but lower height than the peaks 162 and 164. In FIG. 33, the strip 12 has curved sections with different radii provided in the first peaks than in the second peaks.

Figure 34:
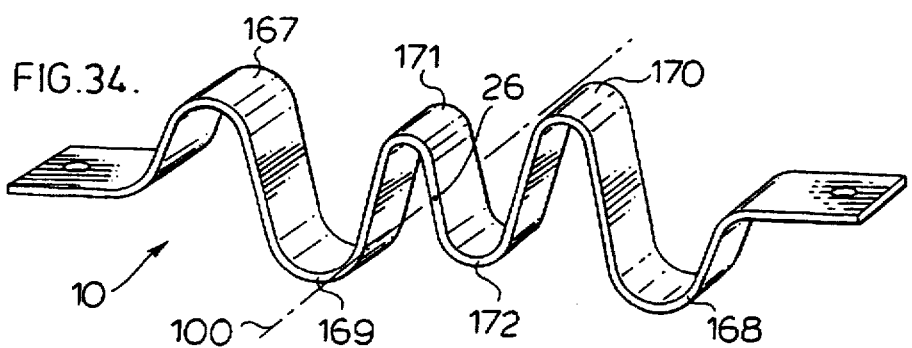

FIG. 34 provides a second generally sinusoidal configuration and in which a centre point is indicated as 26. The left hand side of the strip is identical to the right hand of the strip if rotated 180° about centre 26. Each of the first curved section 16 of the strip to the right hand side of centre 26 and the second curved section 28 to the left hand side of point 26 have three peaks. The outermost peaks 167,168 have the greatest amplitude, intermediate peaks 169,170 have a middle amplitude and the inside peaks 171,172 have the least amplitude. Each of the outermost, intermediate and inner peaks have a different radius of curvature. Thus, the radius of curvature varies over the length of the strip 12 however with each of the halves being the same albeit displaced 180 degrees relative point 26.

Figure 35:
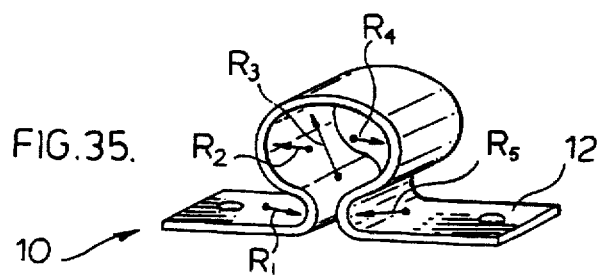

FIG. 35 shows a simplified configuration in which the strip 12 is bent into the shape of the symbol "omega". This shape provides at least five possible radius of curvature indicated as R1, R2, R3, R4 and R5. In the illustrated embodiment, R1 equals R5 and R3 equals R4 such that the device 10 is symmetrical although this is not necessary and it may be preferred to provide all five radii to be different such that each will require different forces to plastically straighten the device.

Figure 36:
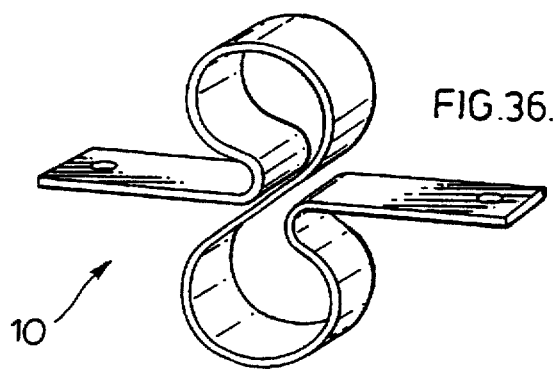

FIG. 36 indicates another configuration of the strip which is symmetrical about point 26 and provides in effect a configuration with two "omega" type curves similar to the device of FIG. 35.

Figure 30:
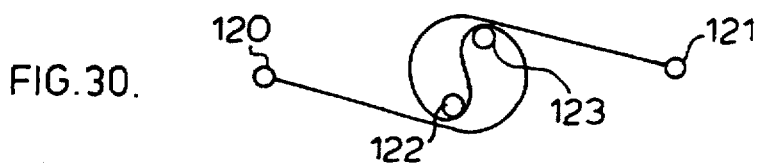
Figure 31:
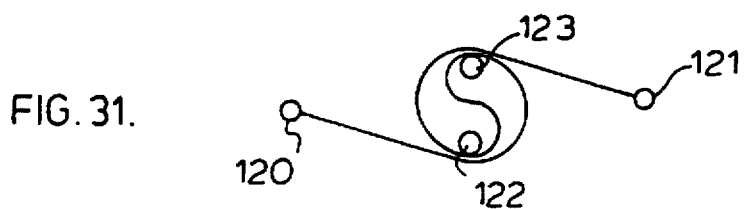

It is to be appreciated that the devices such as shown in FIGS. 5, 32 and 36 are advantageous as more compact than the devices as shown in FIGS. 30, 34 and 35. The more compact devices have a greater ratio of the length of the strip when straight to the length of the resultant curved device. Devices such as shown in FIGS. 5, 21 and 32 are preferred as they are able to deliver a constant deployment force over the majority of their deployment.

Each of the devices shown in the figures have corresponding features insofar as they have a longitudinal axis similar to 33 shown in FIGS. 5 and 10 which passes through the centroid of their cross-sectional area longitudinally throughout their whole length. This longitudinal axis is represented by point 33 in FIG. 10. In a straight flat strip 12 as shown in FIGS. 7, 8 or 9, the longitudinal axis is a straight line. In the final curved forms of the devices, the longitudinal axis lies in a common flat plane such as shown as 99 in FIGS. 6 and 10. For example, in the devices shown in FIGS. 4, 21, and 33 to 36, the single flat plane would be a vertical plane having regard to the orientation in which each device is illustrated passing centrally through the strip 12. In preferred devices 10 as shown in FIGS. 5, 33 and 36, end portions carrying the attachment holes are disposed within a horizontal plane (having regard to the orientation in which each device is illustrated) passing centrally through the point 26 and including the central axis 100, where appropriate.

In the context of energy absorbing devices in accordance with the present invention, different amounts of energy absorption and rates of absorption may be obtained by varying amongst other things one or more of the type of ductile material, the shape of the cross-section of the ductile material with length, the relative size of the cross-sectional material with length, the amount of non-ductile material included, and/or the degree of curvature and/or rotation.

The energy absorbing device in accordance with the present invention can be put to practical use in many applications where a moving body needs to be decelerated or arrested. Fall protection systems of the type utilizing a horizontal or a vertical track are good examples. Use of an energy absorbing device in accordance with the present invention has the advantage of reducing the design stress which must be met by anchors which secure a fall protection system to a structure. Unlike prior art devices, the energy absorber according to the invention exhibits a stable and predictable behaviour under a variety of environmental conditions and it is capable of continuous energy take-up over the entire deployment stroke.

Figure 3:
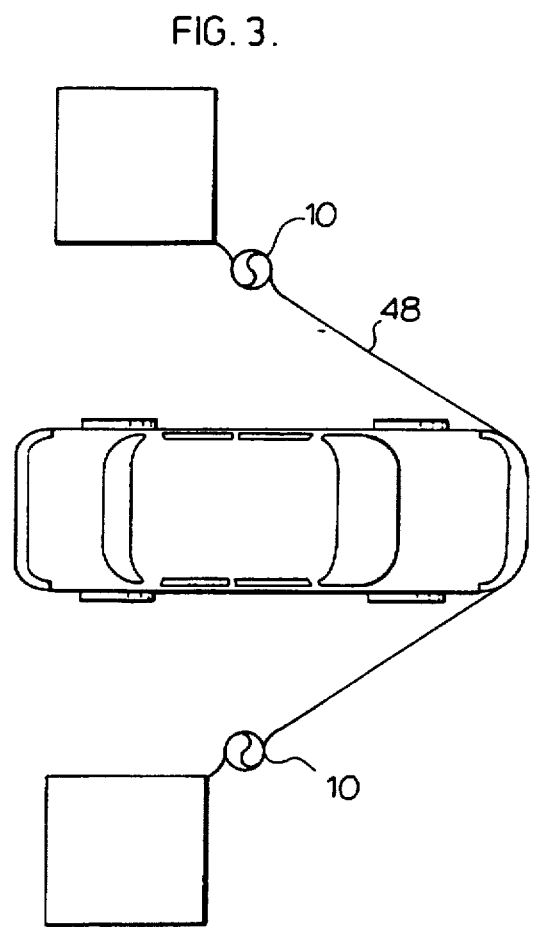
FIG. 3 is a schematic illustration of a system for arresting runaway vehicles using the energy absorber in accordance with the present invention.

The energy absorber could also be used in highway, aircraft or elevators safety applications to arrest runaway vehicles. This example is illustrated in FIG. 3. An arrester cable or barrier 48 is placed across the road. The arrester cable 48 is connected to suitable anchors by energy absorbing devices 10. It will be recognized that the capacity of the energy absorbing devices 10 needs to be increased in order to bring it in the proper relationship with the average vehicular weight. An increase in arresting force can be achieved by increasing the thickness and/or width of the strip, by utilizing a ductile material that deforms at a higher stress, and/or by decreasing the bending radius. An increase in elongation can be achieved by providing the convolved section of the strip with more turns. An increase in deployment force and the elongation will both serve to increase the total energy absorbing capability.

The above description of the preferred embodiments of the invention should not be interpreted in any limiting manner since refinements and variations are possible without departing from the spirit of the invention. The scope of the invention is defined in the annexed claims.

I claim:

1. An energy absorbing device deformable upon the application of kinetic energy in tension to the device, the device comprising:

an elongate member having two ends portions, each end portions carrying a respective attachment means for the application of tension forces, a longitudinal axis extending centrally of a cross-section along a length of the elongate member;

the elongate member formed into a convoluted configuration with the longitudinal axis lying in a common flat plane, the elongate member comprising a continuous element of ductile material extending the length of the elongate member;

the device characterized in that in one side view the elongate member having a central portion of generally "S" shape with each end of the "S" shape merging into a respective clockwise curving portion which extends curving clockwise to overlie initially the other end of the "S" shape and subsequently the other clockwise curving portion;

each clockwise curving portion terminating as a respective one of the two end portions of the elongate member.

2. A device as claimed in claim 1, wherein the central portion of "S" shape is formed of two halves of identical shape joined at a center axis normal the longitudinal axis and the common flat plane with in said side view each half located in an identical orientation to the other half but rotated 180° about the center axis.

3. A device as claimed in claim 2, wherein each clockwise curved portion is of identical shape to the other clockwise curved portion and with in said side view each clockwise curved portion located in an identical orientation to the other clockwise curved portion but rotated 180° about the center axis.

4. A device as claimed in claim 1, wherein each clockwise curving portion is of identical shape to the other clockwise curving portion and with in said side view each clockwise curved portion located in an identical orientation to the other clockwise curve portion but rotated 180° about a center axis normal the longitudinal axis and the common flat plane.

5. A device as claimed in claim 4, wherein each end portion has a terminal section carrying the attachment means, the longitudinal axis through both terminal sections lying in a planar line which includes the center axis.

6. A device as claimed in claim 1, wherein each end portion is diametrically opposite the other end portion.

7. A device as claimed in claim 3, wherein each of the clockwise curving portions spiral outwardly.

8. A device as claimed in claim 1, wherein each clockwise curving portion overlies the other end of the "S" shape and the other clockwise curving portion over an arc of at least 90°.

9. (A device as claimed in claim 1, wherein each clockwise curving portion overlies the other end of the "S" shape and the other clockwise curving portion over an arc of at least 180°.

10. A device as claimed in claim 1, wherein each clockwise curving portion overlies the other end of the "S" shape and the other clockwise curving portion over an arc of at least 270°.

11. A device as claimed in claim 1, wherein both clockwise curving portions curve outwardly about a central axis normal the longitudinal axis and the common flat plane.

12. A device as claimed in claim 11, wherein each clockwise curving portion curves about the central axis an extent of at least 180°.

13. A device as claimed in claim 11, wherein each clockwise curving portion curves about the central axis an extent of at least 270°.

14. A device as claimed in claim 11, wherein each clockwise curving portion curves about the central axis an extent of at least 360°.

15. A device as claimed in claim 1, wherein in any plane normal to the longitudinal axis and the common flat plane the elongate member is symmetrical.

16. A device as defined in claim 1, wherein said ductile material is metal.

17. A device as defied in claim 16, wherein said metal is selected from the group consisting of structural steel, stainless steel, aluminum, copper, titanium and alloys thereof.

18. A device as defined in claim 12, wherein said elongate member is in the form of an elongated strip having a width in the common flat plane significantly in excess of a thickness thereof normal the width.

19. A device as claimed in claim 18, wherein the elongate member is symmetrical in any plane normal to the longitudinal axis and the common flat plane.

20. A device as defined in claim 1, wherein said elongate member has in any plane normal to the longitudinal axis and the common flat plane a cross-section of an elongate shape with a width measured in the common flat plane greater than a thickness measured normal the common flat plane, the elongate shape circumscribing a compression zone and a tension zone separated from one another by a neutral line that extends longitudinally on said cross-section, application of a bending strain to said elongate member compresses material in said compression zone and stretches material in said tension zone while material at said neutral zone remains substantially unstressed.

21. A device as claimed in claim 20, wherein said elongate member includes substantially non-ductile elements.

22. A device as defined in claim 21, wherein said non-ductile element extends along the longitudinal axis in said neutral line.

23. A device as defined in claim 1, wherein said ductile element is configured as a network of crossing elongated rods at least partially embedded in non-ductile material.

24. A device as defined in claim 1, wherein said ductile element defines an internal cavity therein.

25. A device as defined in claim 24, wherein said internal cavity contains a non-ductile material that fractures upon the application of bending strain in order to absorb energy.

26. A device as claimed in claim 1, wherein said elongate member consists entirely of a ductile material.

* * * * *